(12) United States Patent
Emerson

(10) Patent No.: US 6,970,158 B2
(45) Date of Patent: Nov. 29, 2005

(54) COMPUTER KEYBOARD PROVIDING AN ALERT WHEN TYPING IN CAPS LOCK MODE

(76) Inventor: Harry E. Emerson, 27 Garden Ct., Succasunna, NJ (US) 07876

(*) Notice: Subject to any disclaimer, the term of this patent is extended or adjusted under 35 U.S.C. 154(b) by 273 days.

(21) Appl. No.: 10/427,591

(22) Filed: May 1, 2003

(65) Prior Publication Data
US 2003/0206157 A1 Nov. 6, 2003

Related U.S. Application Data

(60) Provisional application No. 60/377,462, filed on May 2, 2002, provisional application No. 60/420,161, filed on Oct. 22, 2002.

(51) Int. Cl.[7] .............................................. G09G 5/00
(52) U.S. Cl. ........................ 345/168; 341/27; 400/477
(58) Field of Search ................................ 345/168, 169, 345/172; 341/22, 23, 27; 400/487, 476, 477, 400/485, 486, 489

(56) References Cited

U.S. PATENT DOCUMENTS

| | | | | |
|---|---|---|---|---|
| 5,034,598 A | * | 7/1991 | Poland | 341/27 |
| 5,065,155 A | * | 11/1991 | Oogita et al. | |
| 5,189,403 A | * | 2/1993 | Franz et al. | 345/172 |
| 5,856,785 A | * | 1/1999 | Bowie et al. | 341/27 |
| 6,320,519 B1 | * | 11/2001 | Hsu et al. | 341/23 |

* cited by examiner

Primary Examiner—Regina Liang

(57) ABSTRACT

A computer keyboard providing an audible alert and a visual alert to the user when the keyboard is in the CAPS LOCK mode of operation. A computer system including a computer keyboard providing an audible alert and a visual alert to the user when the keyboard is in the CAPS LOCK mode of operation. A computer keyboard and a computer system having a timer to turn off the CAPS LOCK mode after a period of time during which no keyboard keys are struck.

16 Claims, 5 Drawing Sheets

Fig. 1

Prior Art

Fig. 2

Prior Art

Fig. 3

Prior Art

Fig. 4

Prior Art

Fig. 5

Prior Art

The presentinvention provides a sim
that the computer keyboard is in C
key is activated and alphanumeric ch
letters. There are two embodim
ments are not mutually exclusive,
r and computer keyboard system.

Fig. 9

Ser. No. 60/377,462, filed May 2, 2002,
COMPUTER KEYBOARD PROVIDING AN ALERT WHEN TYPING IN CAPS LOCK MODE This application claims the benefit of U.S. provisional patent application Ser. No. 60/377,462, filed May 2, 2002, and U.S. provisional patent application Ser. No. 60/420,161, filed Oct. 22, 2002.

BACKGROUND OF THE INVENTION

1. Field of the Invention

The present invention relates to computer keyboards, including the nature of keys provided on the keyboard, the layout of those keys, and the functionality provided by those keys in relation to the computer system.

2. Description of the Prior Art

Computer keyboards have become standardized in their basic format for use with a variety of computers and computer operating systems. In particular, this document refers to computer keyboards compatible with computers designed according to Microsoft Corporation hardware specifications and the Intel Corporation microprocessor and system design (so called Wintel computers, an acronym referring to Microsoft Windows and Intel Corporation), and to keyboards compatible with computer operating systems capable of running on these computers, including the various Microsoft operating systems and varieties of the Unix operating system, especially Linux and its derivatives.

The following section describes the evolution of the computer keyboard from the introduction of the original IBM PC to today's current versions, and describes the function of the major keys and key groupings.

83-Key PC/XT Keyboard Layout

Figure 1:
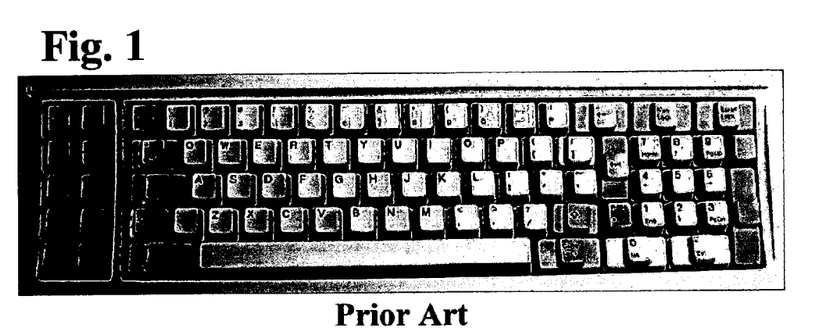
FIG. 1 is an illustration of the 83-key original IBM PC keyboard.

As illustrated in FIG. 1, the very first PC keyboard was the 83-key keyboard produced by IBM for the very first IBM PCs and PC/XTs in the early 1980s. This design was copied nearly verbatim by most of the early PC "clone" makers, and was the standard for PCs of this era. From a layout standpoint, however, there are numerous problems with the original 83-key layout, which caused many typists a great deal of frustration. Here are some of the main issues with this layout, when it is contrasted to more modern configurations:

Cramped Physical Grouping: It is a very "cramped" layout. All of the keys except the function keys are physically contiguous, giving the layout a very "busy" appearance. This is made worse by the fact that many keys are of odd sizes, and there is no clear vertical "dividing line" for the eye between the main typing area and the numeric keypad. Even the function keys are not separated very much from the rest of the layout. Overall, it looks like a "jumble of keys". This may seem a trivial matter but has an impact on those learning to use the PC.

Poor <Shift> Key Size and Location: The <Shift> keys are rather small, and even worse, there is an extra key (backslash and vertical bar) between "Z" and the left <Shift> key, causing touch typists to accidentally hit this extra key when reaching for the left <Shift> key.

Poor <Enter> Key Size and Location: The <Enter> key is also rather small, and too far to the right, with an extra, rarely needed key (back-quote and tilde) between the main typing area and the <Enter> key. The <Enter> key doesn't line up vertically with the right <Shift> key.

Strange <Ctrl> Key Size and Position: Many users found the <Ctrl> key to be too large and in the place where they expected to find the <Caps Lock> key. In turn, the <Caps Lock> key is in an odd location.

No Dedicated Cursor and Navigation Keys: The only cursor and navigation keys are the ones on the numeric keypad. Since the cursor and navigation keys are needed almost all the time, this greatly reduced the utility of the numeric function of that keypad. (Remember that the most popular application in the early days of the PC was Lotus 1-2-3, a spreadsheet program used by financial people who needed both cursor movement keys and the numeric keypad.)

No Indicator LEDs: These early keyboards communicated unidirectionally with the system and could not accept the commands now used to control the indicator LEDs, so they included none. This caused much confusion, particularly given the frequency with which the <Num Lock> key needed to be pressed in order to flip between the cursor keys and the numeric keys. Some PC clone keyboards came out with indicator LEDs on them that were controlled by the keyboard itself to indicate the status of the <NumLock>, <CapsLock>, and <ScrollLock> keys. These mostly worked OK, but had the potential for becoming "out of sync" with what the system thought the state of the toggle modifier keys was.

Left-Side Function Keys: Many users disliked having the function keys on the left hand side of the keyboard, principally because early software would often provide visual cues on the bottom of the screen indicating what roles the different function keys would play in that application, and users wanted to see the function keys "line up" with these cues.

84-Key AT Keyboard Layout

Figure 2:
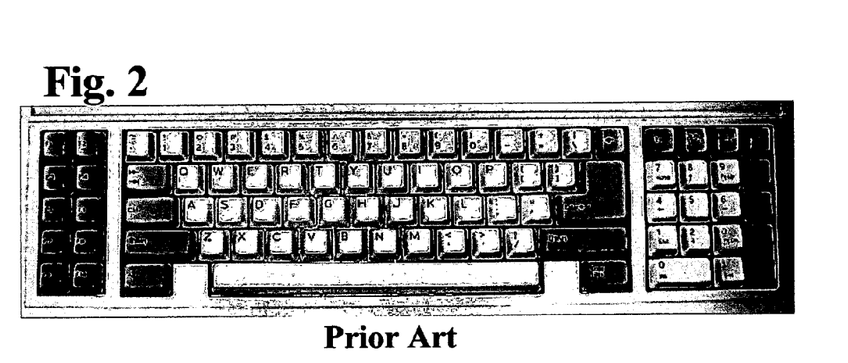
FIG. 2 is an illustration of the 84-key IBM PC/AT keyboard.

IBM received a lot of complaints about the first keyboard design and eventually made improvements to it. The first evolution of the keyboard was the 84-key keyboard layout introduced with the first IBM PC/AT, illustrated in FIG. 2. (The LED indicators are above the numeric keypad and not shown in this photo.) This is sometimes called the AT Keyboard. There are several definite improvements with this layout, compared to the 83-key keyboard:

Better Physical Grouping: The keyboard has three distinct key physical groups, with the numeric keypad placed distinctly to the right. The three groupings have clean vertical lines. The numeric keypad has been reorganized. Overall, the keyboard has a much more organized and understandable appearance.

Improved <Shift> and <Enter> Keys: The left <Shift> key, and the <Enter> key, have been enlarged, and the seldom-used "intervening" keys relocated.

LED Indicators: With the new internals of this keyboard (see below), LED indicators for the "lock" functions were added.

Extra "System Request" Key: This is the "84th key". It was mostly used for special control operations for PCs operating in communication with mainframe computer systems.

However, many of the layout issues with the original design remained. The biggest concern that remained unaddressed was the continued sharing between the numeric keypad, and the cursor and navigation keys. The function keys are still on the left-hand side, and the <Ctrl> and <Caps Lock> keys are still different from what a typist would expect.

This keyboard was changed internally from the PC/XT model as well. The interface was made bidirectional, allowing the system to send commands to the keyboard, and enabling the control of the new LED indicators. The signaling and interface protocols created with this first PC/AT keyboard are still used today, even though the 84-key layout is no longer used, having been replaced by the "Enhanced" 101-key keyboard.

101-Key "Enhanced" Keyboard Layout

Figure 3:
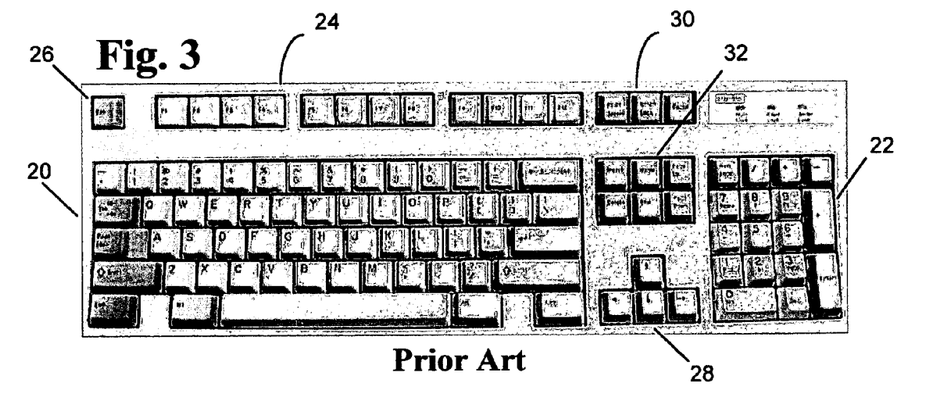
FIG. 3 is an illustration of the 101-key Enhanced IBM keyboard.

In 1986, IBM introduced the IBM PC/AT Model 339. Included in this last AT-family system was the new Enhanced 101-key keyboard illustrated in FIG. 3. This 101-key keyboard would become the de-facto standard for keyboards through the current day. Even today's 104-key Windows keyboards and variants with extra buttons and keys are based on this layout. The "Enhanced" keyboard was electrically the same as the 84-key AT keyboard, but featured a radically redesigned key layout. The major changes included these:

Dedicated Cursor and Navigation Keys: Finally, separate keys were provided for cursor control and navigation. This enabled the numeric keyboard to be used along with the cursor and navigation keys. The cursor keys were also made into an "inverted-T" configuration for easier movement between the "Up" key and the "Down" key with a single finger.

Relocated Function Keys: The function keys were moved from the left-hand side of the keyboard to a row along the top, and divided into groups of four for convenience.

Extra Function Keys: Two additional function keys, <F11> and <F12> were added to the keyboard.

Relocated <Esc> and <Caps Lock> Keys: The <Esc> key was moved back to the left-hand side of the keyboard, and placed up above the main typing area. The <Caps Lock> key was moved above the left <Shift> key.

Extra <Ctrl> and <Alt> Keys: Additional <Ctrl> and <Alt> keys were added on the right side of the <Space Bar>.

Extra Numeric Keypad Keys: The numeric keypad was fitted with an additional <Enter> key, as well as the "/" (divide operator) that had been missing up to that point.

Compared with the 84-key keyboard the Enhanced keyboard layout was perceived by most users to be far superior. It was an immediate hit despite its one obvious inferiority to the AT keyboard due to the smaller main <Enter> key.

With these improvements, the 101-key keyboard layout became the standard, and was modified only slightly by the nearly identical 104-key Windows keyboard which is the standard now. Although the 101-key/104-key designs are the "standard", some manufacturers have introduced variations of the basic design to make minor improvements. For example, a common modification is to enlarge the <Enter> key back to its "84-key layout size", and squeeze the backslash/vertical-pipe key between the "=/+" key and the <Backspace>.

102-Key "Enhanced" Keyboard Layouts

Several slightly modified versions of the regular American English 101-key Enhanced keyboard were created by IBM for by non-English PC users. These keyboards are virtually identical to the regular 101-key Enhanced keyboards, incorporating just slight differences from the regular U.S. keyboard. Considering the United Kingdom layout as an example, the following changes have been made:

The regular number "3" key now yields "£" instead of "#" when shifted.

The back-quote key yields the "-" (horizontal bar) symbol when shifted instead of a tilde ("~").

The main <Enter> key has been enlarged; it is now L-shaped again (though upside-down}

An extra key (the $102^{nd}$) containing the supplanted "#" and "~" symbols has been added to the left of the main <Enter> key. (This seems a step backwards given the complaints about an extra key in this location in the 83-key layout.)

Another step backwards: the backslash/vertical bar key has been relocated back to its former place—to the right of the left <Shift> key.

104-Key "Windows" Keyboard Layout

Figure 4:
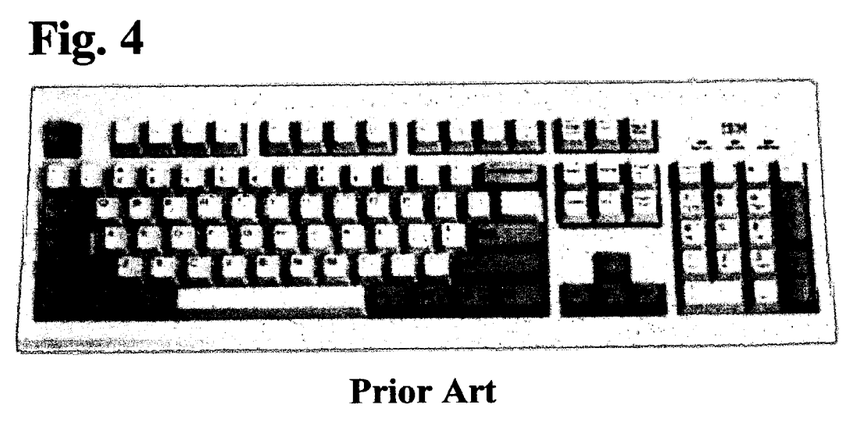
FIG. 4 is an illustration of the 104-key "Windows" keyboard.

As Windows became the predominant operating system in the PC market, Microsoft realized that many common Windows functions had no simple keyboard shortcuts to activating them. Seizing their leadership position, they created a specification for a new variant of the 101-key keyboard that includes special keys to activate common Windows functions. This design is the 104-key "Windows" keyboard, illustrated in FIG. 4.

This layout is identical to the 101-key Enhanced layout with the exception of the additional three keys: one Windows key on either side of the <Space Bar>, and a Windows context menu (right-click) key to the right of the <Space Bar>. This layout makes room for them by stealing real estate from the <Alt>, <Ctrl>and <Space Bar>keys along the bottom of the keyboard. In addition to the new Windows keys, the particular keyboard model shown in the illustration of FIG. 4 incorporates the larger main <Enter> key, enabled by moving the backslash/vertical pipe key up one row, placed next to the now-smaller backspace key. Although the particular model as shown incorporates this <Enter> key modification, the majority of Windows keyboards on the market incorporate the <Enter> key layout of the 101-key Enhanced keyboard. The functions of the two types of Windows keys are as follows:

"Windows" Keys: Two keys, one to the left of the <Space Bar> and one to the right, are used to activate various functions within the operating system. If either is pressed by itself, it puts the Windows task bar in the foreground and opens the Windows start menu. (Note that this is identical to the function performed by the key combination <Ctrl>+<Esc>). The Windows keys are also like modification keys, as they enable several "short cut" actions through special key combinations such as opening the Windows Explorer by simultaneously pressing a Windows key and the <E> key.

Context Menu Key: This key, on the right-hand side of the keyboard, is used to simulate right-clicking the mouse at its current location. Under standard Windows functionality, this opens up a context menu of commands relevant to the Window or object the mouse was over at the time the key was pressed.

Since the Windows keyboard offers some flexibility that the regular Enhanced layout does not, and its cost of production is virtually unchanged, it quickly replaced the Enhanced layout as the de-facto standard on most PCs. Most keyboards today, whether they are included with new PCs or sold separately, are some variation of the 104-key Windows keyboard layout.

Modern 104-Key Windows Keyboards with Special Purpose Keys

Many specialty keyboards have extra keys or buttons, above and beyond the keys normally found on "standard" keyboards. These are becoming increasingly popular as companies look to provide convenience features on the keyboard, and possibly differentiate their offerings from those of competitors. Keyboards dubbed "Internet keyboards" or "multimedia keyboards" usually have at least some of these extras.

These special keys are usually provided in addition to the regular 104 keys of a standard Windows keyboard, squeezed in along the top of the keyboard or on the right-hand or left-hand side. They of course differ by keyboard type, however, they commonly fall into the following categories.

Internet Shortcuts: A series of buttons to implement common Internet functions, such as connecting to the 'net, or opening a web browser or email software.

Audio Controls: Buttons that let you raise or lower your PC's sound volume, mute the sound, and so on. Some also include buttons that implement standard CD player functions: start/stop, pause, next, previous and such. Some include a rotary volume control.

Mouse Controls: Buttons that simulate movement of the mouse, or mouse clicks.

Figure 5:
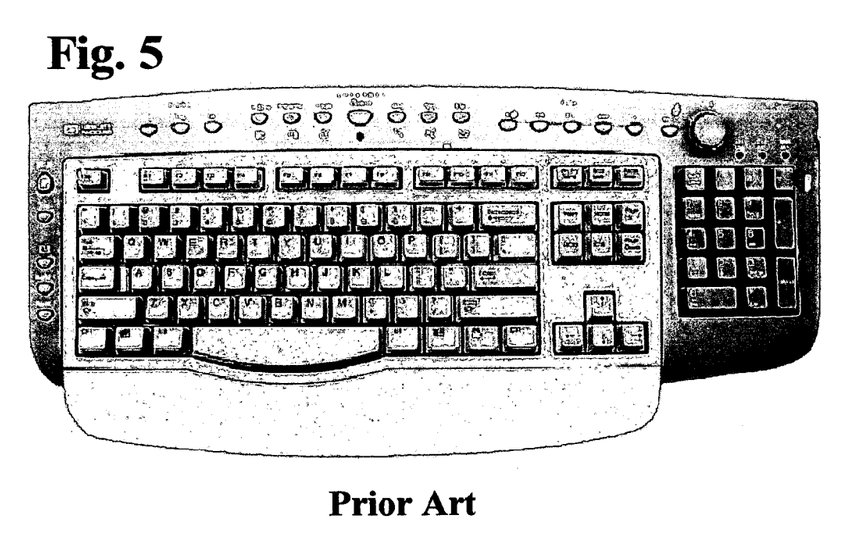
FIG. 5 is an illustration of a contemporary "multimedia" keyboard.

An example of a 104-key Windows keyboard with additional special purpose keys is illustrated in FIG. 5. This Hewlett-Packard keyboard is just packed with extra buttons and features. These include numerous Internet buttons, audio controls, CD player controls, and a rotary volume control (visible in the upper right hand corner).

Programmable keyboards which allow the user to define the role of individual keys also typically have extra keys, which are used to enable programming modes. Also, some foreign-language keyboards have additional keys corresponding to special characters required for those languages.

Since "extra" keys are non-standard and differ for each keyboard, special drivers or software are required to enable the special functions. Otherwise, the operating system won't know what to do with the unexpected, non-standard scan codes, and will probably just ignore them. More popular keyboards may have support built into Windows, and some foreign-language keyboards may also have native support. Otherwise you will need driver software from the maker of the keyboard.

Description of the Major Types of Keys

This section describes the purpose and operation of the major types of keys found on the 101-key and 104-key standard keyboards. The primary typographic keys include the following:

Alphabetic Keys: The keys A through Z. Regular keypresses produce lower-case letters, and shifted keypresses create upper-case letters. <Caps Lock> reverses the <Shift> key functionality.

Numeric/Punctuation Keys: These are the numeric keys along the top of the keyboard, above the alphabetic keys. Shifted, they produce various punctuation and special symbols. The numerics are pretty much universal on English-language keyboards; the punctuation symbols can be different depending on region. For example, the "#" key in the United States is a "£" symbol in the United Kingdom.

Other Main Punctuation Keys: Most of the other punctuation keys on the keyboard are located just to the right of the alphanumeric keys mentioned above. While they have special meaning in some software applications, they are "just characters" most of the time.

"White Space" Keys: These include the primary (main) <Enter> key, the <Tab> key and the <Space Bar>. These keys are used for formatting text, and to delimit text entries and commands. Collectively they are often referred to as "white space" since they are characters that separate "real" characters without containing any information in and of themselves. There is also a secondary <Enter> key that is part of the numeric keypad.

<Delete> and <Backspace> Editing Keys: In text-based applications—or in text fields within other applications (for example, a Web browser)—these keys are usually used in conjunction to allow deleting of characters. The standard followed in most software is that the <Delete> key removes a character to the right of the insertion point, and the <Backspace> key removes a character to the left of the insertion point. In other contexts such as word processors and email programs, the <Delete> key may be used to delete or remove any type of object; in these applications, regions of text and objects may be selected, for example, by using the techniques described for the <Shift> key, and then deleted by pressing the <Delete> key.

One of the most important advances of the new 101-key "Enhanced" keyboard created by IBM was the creation of separate, dedicated cursor-control and navigation keys. These had formerly been accessible only by using the numeric keypad. On modern keyboards these important keys are generally placed between the numeric keypad and the main typing area. The cursor control and navigation keys are also still also available using the numeric keypad, of course, but this is rarely used today. This set of keys includes the following:

Arrow Keys: These keys permit motion in most software programs in any of the four standard directions that exist in two dimensions: up (north), down (south), left (west) and right (east). In many programs these perform functions similar to those that a mouse does, simulating two-dimensional movement. Some keyboards actually have eight arrow keys; the additional four keys are diagonals that correspond to the "northwest", "northeast", "southwest" and "southeast" directions. The default arrangement is an "inverted-T" configuration. Some keyboards may use instead a "diamond pattern", with the up arrow key higher.

<Page Up> and <Page Down>: These keys (sometimes labeled "PgUp" and "PgDn") are used in software programs primarily for one-dimensional scrolling, for example, to go up or down one page in a spreadsheet program, word-processing document, Web page and so on.

<Home> and <End>: The <Home> key is usually used to go to the left side of the current line in a document, and the <End> key to the right side. The current line is the line of text having the active cursor, meaning the location on screen where the next keyboard action will take place.

The keyboard contains several keys that serve primarily to alter the function or meaning of other keys. They are often used in combination with another key (typically by holding them down and then pressing the other key) or are typically used to set a particular keyboard state. These will be referred to as modification keys, grouped into two different subcategories. The first are temporary modification keys, because they modify other keys only while held down. This includes:

<Shift> Keys: These two keys are near the bottom of the keyboard, one on either side of the main typing area. They enable access to capital letters, and also to the "alternate" functions printed on the keycaps above the unshifted symbol or function shown. So for example, holding the <Shift> key down and pressing the equal sign ("=") generates a plus sign ("+"). The <Shift> keys also change the behavior of the function keys in most software programs; for example, <Shift>+<F6> is different than just <F6>. The <Shift> key functions within Windows applications to create a selected region of text or objects (or both) when used in conjunction with the navigation keys; holding the <Shift> key down while simultaneously pressing an arrow key, the <Home>, <End>, <Pageup>, or <PageDown> keys will create a selected region. A selected region can be deleted with the <Delete> key, or can be moved, copied or have other actions performed on it according to the capabilities of the software application being used.

<Ctrl> Keys: These are the "control keys"; one is located on either side of the typing area. Sometimes the keycap says "Control" instead of the shortened "Ctrl". These keys are used in combination with regular alphanumeric keys and also the function keys to control special features and functions in software programs.

<Alt> Keys: These are the "alternate control keys". They operate the same way the <Ctrl> keys do; their presence just lets complex software have more options. For example, <Alt>+<F6> can be a different function than <Ctrl>+<F6>. The <Alt> keys are also used for ASCII code generation.

<Insert>: In modern computing systems this key functions as a toggle key to switch between the normal "insert mode", where all typed characters are automatically inserted, and "replace mode", where typed characters replace those at the text insertion point. Historically it was used to insert a space in a text area each time it is pressed, but that usage is now rare.

The temporary modification keys can be combined if held down. For example, holding down <Shift>+<Ctrl>+the up arrow in the Microsoft Word application will select the entire current paragraph.

The second sub-category contains locking modification keys. These are toggle keys—they change the function of other keys until they are pressed again to cancel the effect:

Caps Lock: When pressed, causes the function of the <Shift> keys to be reversed, but only for letter characters; other keys are unaffected. When active, the Caps Lock LED will be lit.

Num Lock: Enables the numbers on the numeric keypad when activated, and lights the Num Lock LED as well. When not active, the numeric keypad's keys generate cursor-control functions instead. This functionality dates back to the earliest PCs, which did not have dedicated cursor-control keys; today the cursor-control functions on the numeric keypad are redundant, which is why many people leave Num Lock always enabled.

Scroll Lock: Lights the Scroll Lock LED and causes some software programs to alter their behavior when certain other keys are pressed. In particular, when Scroll Lock is active, the cursor keys are often used to scroll the visible document rather than change position within it. This is not used nearly as much as the other two.

Lastly, the 101-key and 104-key keyboards include some miscellaneous keys not easily categorized; they are:

Function Keys: The function keys are a set of twelve numbered keys that are used by different software programs for a variety of different purposes. They are sometimes called programmable function keys or just F-keys or PF-keys. The original PC keyboard designs had 10 function keys, arranged in a 2×5 matrix on the left-hand side of the keyboard. With the introduction of the 101-key Enhanced keyboard, this was expanded to 12 keys, which were moved to a single row along the top of the keyboard. The exact duty of the function keys depends entirely on how the software chooses to interpret them.

<Escape>: The Escape key is usually used as an "exit" key of sorts by programs, to cancel commands or get out of something. It is also used in some contexts to change the meaning of subsequent characters.

<Print Screen/Sys Rq>: When pressed from DOS, this key causes the contents of the current screen of text to be sent to an attached printer. From within Windows, it copies the contents of the screen, in graphical format, to the Windows clipboard. The alternate use of this key is for the "system request" function. This is a historical command originally based on older IBM terminal designs, and is not really used any more.

<Pause/Break>: When pressed by itself, pauses the display or operation of some software programs. When pressed in combination with the <Ctrl> key, sends a "break" command that will interrupt some software programs or DOS commands. (You can do the same thing with <Ctrl>+C).

Key Groupings

The 101-key and 104-key keyboards are divided into seven major key groupings. Referring to FIG. 3, they are: a) the main alphanumeric (typewriter) section 20; b) the numeric cluster 22; c) the function keys 24; d) the Escape key 26; e) the arrow cluster 28; f) the miscellaneous key group 30 comprising <PrintScreen>, <ScrollLock>, and <Pause>; and g) the navigation key group 32 comprising <Insert>, <Delete>, <Home>, <End>, <PageUp>, and <PageDown>.

Prior Art Deficiency and Opportunity for Improvement

As reported in the preceding narrative, there has been development and advancement in the design, functionality, and usability of the computer keyboard over the last two decades, driven primarily by deficiencies and difficulties experienced by the user community. However, not all needs and opportunities for improvement have been entirely obvious to previous developers, and the pretext of this patent application is that there remains room for improvement.

In particular, touch typists frequently experience the problem of typing characters into a document in all capital letters (Caps) because the CAPS LOCK key has remained on from the previous typing occasion. Even though there is a keyboard light to alert the user to the fact that the keyboard is in the CAPS LOCK mode, touch typists may seldom look at the keyboard, and even if they do, the CAPS LOCK light is easy to overlook. Instead of looking at the screen of keyboard, touch typists commonly look at the source materials they are using to create the on-screen document. If the CAPS LOCK key happens to be on (and consequently the keyboard is in the CAPS LOCK mode) when the user starts typing, the new text will all be entered in capital letters. The next time the user glances at the screen they will notice the error and will need to take steps to correct it. Even though there might be simple ways to make such a correction, creating the typing error and having to correct it is an annoyance, and an improvement to minimize or eliminate this annoyance would be desirable.

Because of the deficiency of the current keyboard design, there remains a need in the art for a keyboard design having a means to alert the typist when the keyboard is in CAPS LOCK mode.

SUMMARY OF THE INVENTION

The present invention provides a simple means for computer users to be alerted to the fact that the computer keyboard is in CAPS LOCK mode, that is to say that the CAPS LOCK key is activated and alphanumeric characters that are typed will appear on-screen in capital letters. There are two embodiments to the CAPS LOCK alert; these two embodiments are not mutually exclusive, and both could be implemented into the same computer and computer keyboard system.

In the first embodiment, an audible alert is provided to the typist when they begin to type while the keyboard is in CAPS LOCK mode. The audible alert is optionally provided by the "keyboard bell" mechanism, although other implementations are possible as well. In the era of Teletype machines, keyboards actually had a bell which would ring upon the sending or receipt of an appropriate signal (which actually is the ASCII bell character, character 07 in the ASCII table). (Note: ASCII is the American Standard Code for Information Interchange. The lower 128 characters are identical in the ASCII and ANSI standards. In common industry terminology, the ASCII standard is usually mentioned in reference to a specific character and character number, but it would be equally accurate to refer to the ANSI bell character 07 in the ANSI table.) The keyboard bell mechanism still exists in modern Personal Computers since every computer keyboard is capable of generating all of the lower 128 characters, including the bell character. Typing "Control-g" (or "Control-G") generates the bell character. The modern computer, rather than having a bell in the keyboard, would use the system speakers to produce an equivalent audible sound. Therefore, one possible implementation of this embodiment is to have the keyboard generate a bell character as the alerting signal. Additionally, there are many possible methods for having a keyboard generate a software signal or message to which the computer system will respond by creating an audible sound, and any such method would constitute a satisfactory implementation of this embodiment of the current invention. Furthermore, the logic that generates such a software signal or message need not come from the keyboard, but could originate from any hardware or software component in the system which is involved in processing keyboard data. Therefore, in an alternative implementation of this embodiment of the current invention, either the computer's hardware, operating software, keyboard driver software component, or an application software is arranged to generate an audible signal to indicate that the CAPS LOCK mode is active when a user begins to type.

In the preferred embodiment the keyboard is provided with a USB interface to the computer system. USB interfaces are message oriented and convey messages of a wide variety to the computer operating software, drivers, or applications. Logic within the keyboard determines if typing has begun while the keyboard is in the CAPS LOCK mode, and if so sends an appropriate message to a keyboard driver software. The keyboard driver software responds by generating an audible signal through the computer's speakers.

There is one computer accessory vendor having a software application that provides a similarly intended service to the alert provided by the current invention. In that vendor's product the user can select to have the system generate an audible click whenever the CAPS LOCK key is turned on or off. That arrangement, however, provides no useful function since the typist knows when they are pressing the CAPS LOCK key. It does not alert the user to the fact that the CAPS LOCK key has already been activated when they start typing.

In another embodiment of this invention the user is given a visual indication that the keyboard is in CAPS LOCK mode. In the standard software implementation of word processors, email editors, and similar programs, an insertion cursor, typically presented as a vertical line, is used to indicate the location on-screen where the next typed character will appear. Since even a touch typist will frequently use the mouse or cursor arrows to position the insertion cursor before beginning to type, a visual cue utilizing the insertion cursor would be helpful to indicate the state of the CAPS LOCK key. In this embodiment, the insertion is changed to have an identifying characteristic when the CAPS LOCK key is turned on. An identifying characteristic might include a unique shape or color, a distinctive blink rate, and so on.

In yet another embodiment of this invention, the CAPS LOCK mode is associated with a software timer, preferably adjustable by the user. While in the CAPS LOCK mode, the timer starts or restarts every time a key is struck. A reasonable period of time for such a timer would be five or ten seconds. If the duration of time specified by the timer passes with no key strokes, the timer expires and the CAPS LOCK mode is turned off. Optionally, the CAPS LOCK mode LED might blink momentarily when the CAPS LOCK mode is turned off, as an announcement to the user.

BRIEF DESCRIPTION OF THE DRAWINGS

The invention will be more fully understood when reference is had to the following detailed description of the preferred embodiment of the invention and the accompanying drawings, in which.

DETAILED DESCRIPTION OF THE INVENTION

The present invention provides a simple means for computer users to be alerted to the fact that the computer keyboard is in CAPS LOCK mode, that is to say that the CAPS LOCK key is activated and alphanumeric characters that are typed will appear on-screen in capital letters. There are two aspects to the CAPS LOCK alert invention; these two aspects are not mutually exclusive, and both could be implemented into the same computer and computer keyboard system.

In the audible alert aspect of the current invention, an audible alert is provided to the typist when they begin to type while the keyboard is in CAPS LOCK mode. The location of the logic which determines that the user has begun typing while the keyboard is in CAPS LOCK mode is arbitrary. It could optionally reside in the keyboard, in the computer's operating software, in a software keyboard driver, or in some similar hardware or software component of the computer system. In the preferred embodiment of the audible alert aspect of the current invention, this logic is contained in the keyboard which communicates an appropriate message via a USB (Universal Serial Bus) connection to a keyboard driver software component running on the computer system. The keyboard driver then generates an audible signal.

The general rules of the CAPS LOCK alerting logic are as follows: If the CAPS LOCK key is pressed and the user begins to type alphabetic characters promptly, do not alert them to the CAPS LOCK mode; If the CAPS LOCK key has been on for a while after the last alphabetic key has been typed, long enough that the user may have forgotten that the keyboard is in the CAPS LOCK mode, sound an alert when the next alphabetic key is typed. Optionally the alert may also sound when the CAPS LOCK key is activated.

Figure 6:
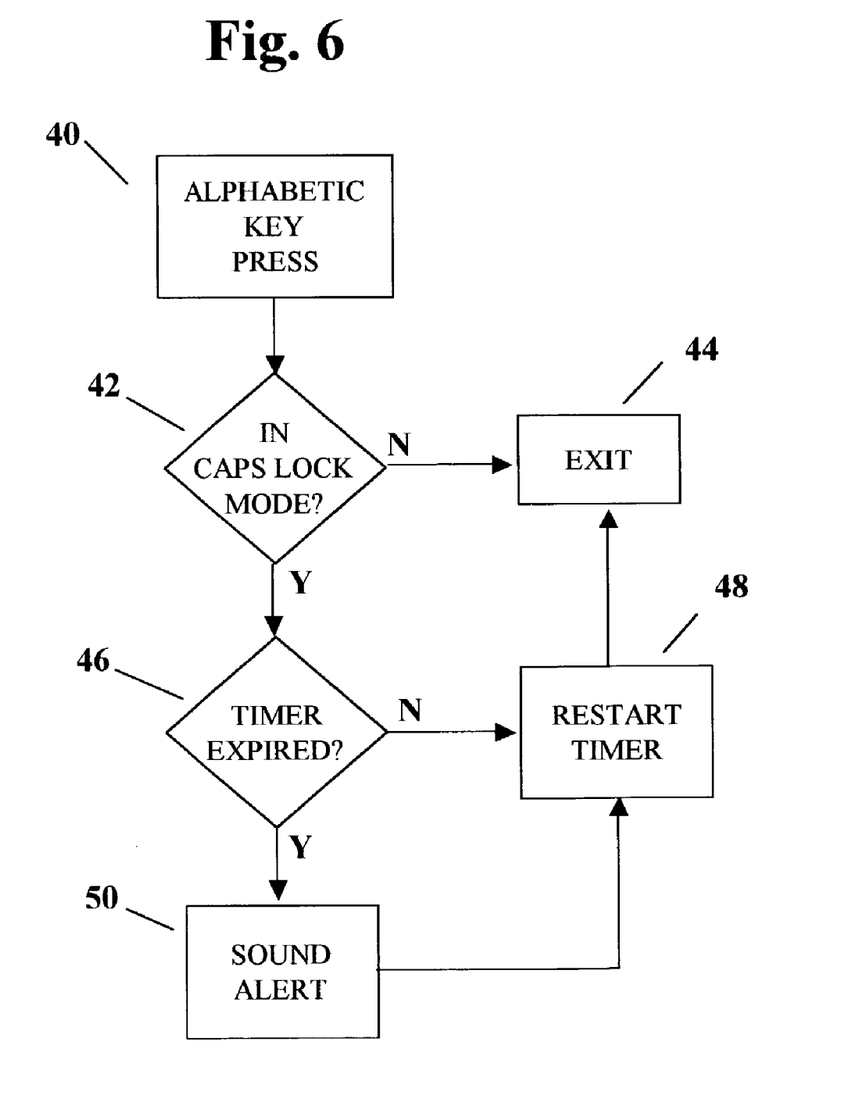
FIG. 6 is a flow chart of the audible alert logic.

In order to accomplish the above general rules, the CAPS LOCK alerting logic incorporates a timer of an arbitrary period such as ten seconds. The logic functions as described in the flow chart of FIG. 6: At step 40 the system determines that an alphabetic key press has taken place. At step 42, if the keyboard is not in CAPS LOCK mode the logic stream exits to step 44, but if the keyboard is in CAPS LOCK mode the timer is examined in step 46. If the timer has not expired then the alert will not be sounded; instead the timer is restarted at step 48, and the logic system exited at step 44. If the timer has expired at step 46 then the system moves to step 50 to sound the alert, then restarts the timer at step 48, and finally exits at step 44.

In another aspect of this invention the user is given a visual indication that the keyboard is in CAPS LOCK mode. In the standard software implementation of word processors, email editors, and similar programs, an insertion cursor, typically presented as a vertical line, is used to indicate the location on-screen where the next typed character will appear. Since even a touch typist will frequently use the mouse or cursor arrows to position the insertion cursor before beginning to type, a visual cue utilizing the insertion cursor would be helpful to indicate the state of the CAPS LOCK key. In this aspect of the current invention, the preferred embodiment is to change the insertion cursor to have an identifying characteristic when the CAPS LOCK key is turned on. An identifying characteristic might include a unique shape or color, a distinctive blink rate, and so on.

Figure 7:
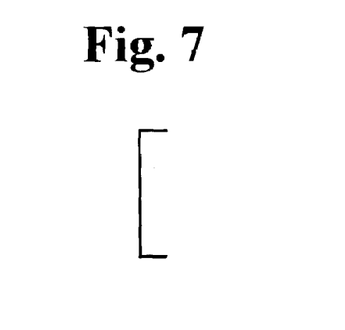
FIG. 7 is an illustration of an implementation of a CAPS LOCK alerting insertion cursor.
Figure 8:
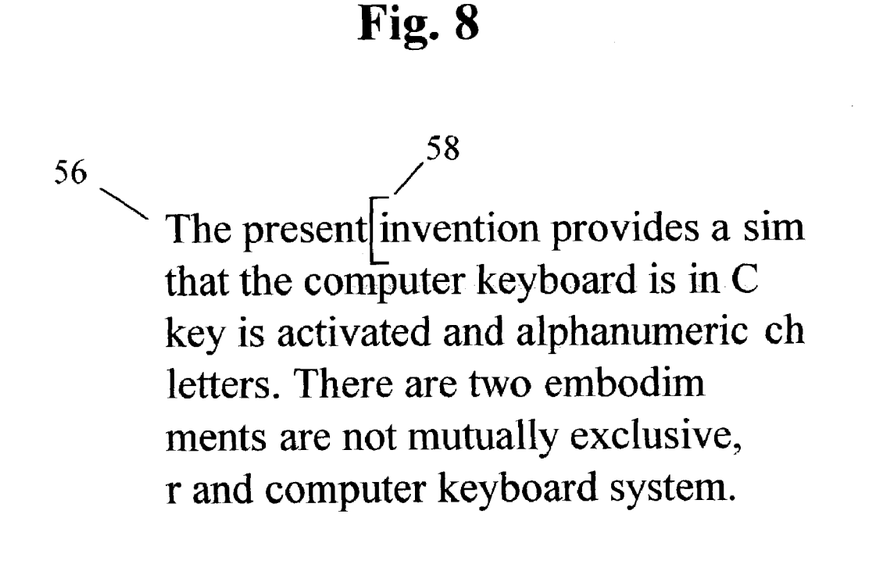
FIG. 8 is an illustration of a portion of text incorporating the insertion cursor of FIG. 7.

FIG. 7 illustrates an alternate shape for the insertion cursor to serve the CAPS LOCK alert function. FIG. 8 illustrates a block of text 56 in which the new form of the insertion cursor 58 can be seen between the words "present' and "invention".

In order to activate and deactivate the CAPS LOCK alert cursor, appropriate messages are sent from the keyboard or keyboard device driver software whenever the keyboard is in the CAPS LOCK mode to indicate to the operating system and application software that the alert cursor is to be used.

Figure 9:
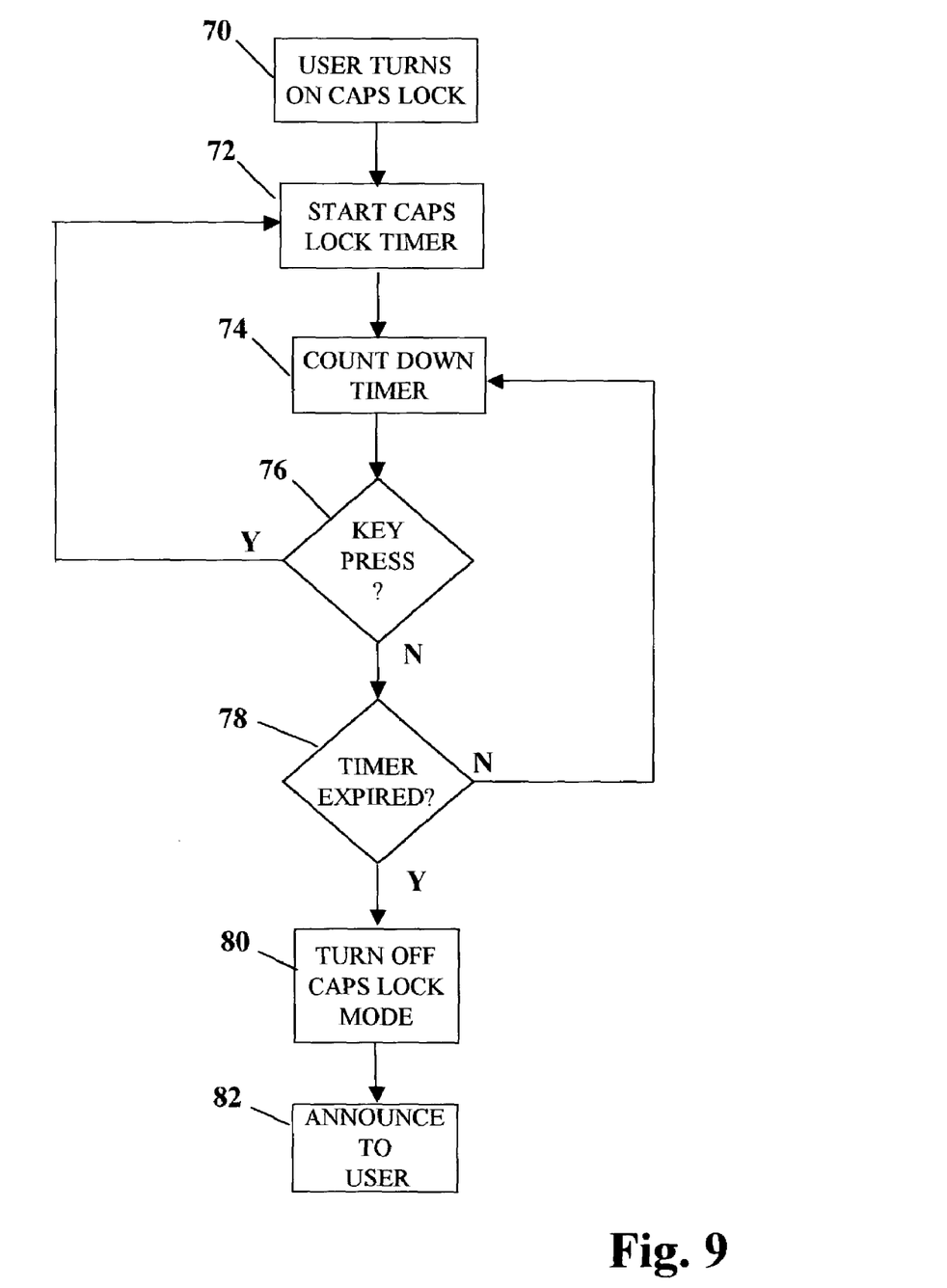
FIG. 9 is a flow chart of the CAPS LOCK timeout logic.

FIG. 9 is a flowchart that illustrates another aspect of this invention associated with a CAPS LOCK mode timer, implemented in keyboard or system software or similar logic. While in the CAPS LOCK mode, the timer starts or restarts every time a key is struck. The timer will expire after a specified period in which no keys are struck. A reasonable period of time for such a timer would be five or ten seconds. Upon expiration of the timer, the CAPS LOCK mode is turned off. The timer duration may be adjustable by the user, and the feature may be activated or inactivated by the user. Optionally, an announcement may be provided to the user when the CAPS LOCK mode is turned off, such as by blinking the CAPS LOCK mode LED momentarily, sounding an audible indicator, or providing a brief visual indicator on the user's display screen.

In terms of general operation, the user turns on the CAPS LOCK key and types whatever they wish in capital letters. The timer is perhaps set to default to five seconds. Every time the user strikes a key while the timer is still active, the five-second timer restarts. When five seconds has transpired with no keystrokes, the system turns off the CAPS LOCK mode, and optionally provides an indication to the user announcing that event.

Referring to FIG. 9, the process starts at process block 70 when the user presses the CAPS LOCK key to enter the CAPS LOCK MODE, causing a CAPS LOCK timer to start at block 72. Presuming that this is a countdown timer, the timer counts down at regular intervals at block 74. If a key press has occurred at block 76 before the timer has expired, the timer logic reverts to process block 72 and restarts the timer. If no key press has occurred and the timer has not yet expired at block 78, the system reverts to block 74 and continues to count down. If, however, the timer has expired, the process flows to block 80 and turns off the CAPS LOCK mode. Optionally, an indication that the CAPS LOCK mode has been terminated is provided to the user at process block 82.

The general nature of the operation of a keyboard is as follows: messages are generated by the keyboard electronics in response to a key press, the keyboard electronics delivers the messages to the computer operating system via a keyboard driver software component, and the computer operating system delivers the messages to the software application which presents the typed characters on the computer's screen.

There are several contemporary computer hardware designs and operating systems. For example, there are currently a variety of Microsoft Windows operating systems in use, the BeOS (the Be Operating System), the Apple Macintosh operating system, a wide variety of UNIX operating systems and derivatives including SUNOS (Sun Microsystems), HPUX (Hewlett Packard), and LINUX. Each hardware and software system presents a unique method of implementing keyboard functions into the overall system by the use of keyboard driver software, system messages, etc. In addition, the keyboard functions of this invention could be implemented by hardware and operating system software not yet in existence. Therefore, the precise nature of the associated keyboard driver software and messages to be sent to the operating system or to a software application to indicate turning the CAPS LOCK mode on or off, or to indicate the typing of a symbol or alphabetic key while in CAPS LOCK mode are beyond the scope of this patent application. It is ample to point out that the methods and means to implement such functionality are well known in the art, and individuals skilled in the art would be capable of implementing a system which could function according to this invention.

Having thus described the invention in rather full detail, it will be understood that such detail need not be strictly adhered to, but that further changes and modifications may suggest themselves to one skilled in the art falling within the scope of the present invention as defined by the subjoined claims.

What is claim is:

1. A computer system for providing an audible alert to a user typing on a keyboard when said keyboard is in CAPS LOCK mode, comprising:

(a) means to determine if said keyboard is in CAPS LOCK mode, said CAPS LOCK mode being entered into when the CAPS LOCK key is activated and causing alphabetic characters associated with typed alphabetic character keys to be presented on-screen in capital letters;
(b) means to detect user keystrokes;
(c) means within said computer system to generate an audible alert;
(d) a timer associated with said CAPS LOCK key and having a duration limit, said timer being expired when said duration limit is exceeded;
(e) means to generate said audible alert when an alphabetic character key is typed while said keyboard is in said CAPS LOCK mode and after said timer has expired; and
(f) means to start or restart said timer each time said CAPS LOCK key is activated into said CAPS LOCK mode, and when an alphabetic character key is typed while in said CAPS LOCK mode.

2. A computer system as recited in claim 1 wherein said audible alert will be generated when the first alphabetic character key is typed while said keyboard is in said CAPS LOCK mode and after said timer has expired, said timer being started or restarted each time said CAPS LOCK key is activated into said CAPS LOCK mode, and when an alphabetic character key is typed while in said CAPS LOCK mode.

3. A computer system as recited in claim 1 wherein said software function resides within said keyboard.

4. A computer system as recited in claim 1 wherein said software function resides within a keyboard driver.

5. A computer system as recited in claim 1 wherein said software function resides within the operating system.

6. A computer system as recited in claim 1 wherein said software function resides within a supplemental module to the operating system.

7. A computer system as recited in claim 1 wherein said software function resides within an application program.

8. A computer system for automatically turning off the CAPS LOCK mode, comprising:
(a) means to determine if said keyboard is in CAPS LOCK mode, said CAPS LOCK mode being entered into when the CAPS LOCK key is activated;
(b) means to detect user keystrokes;
(c) a timer associated with said CAPS LOCK key and having a duration limit, said timer being expired when said duration limit is exceeded;
(d) means for said timer to be started or restarted each time said CAPS LOCK key is activated into said CAPS LOCK mode, and after each alphabetic key is typed while in said CAPS LOCK mode; and
(e) means to turn off said CAPS LOCK mode upon expiration of said timer.

9. A computer system as recited in claim 8 further comprising a means for alerting the user when said CAPS LOCK mode is turned off as a result of the expiration of said timer.

10. A computer system as recited in claim 8 wherein said software function resides within said keyboard.

11. A system as recited in claim 8 wherein said software function resides within a keyboard driver.

12. A computer system as recited in claim 8 wherein said software function resides within the operating system.

13. A computer system as recited in claim 8 wherein said software function resides within a supplemental module to the operating system.

14. A computer system as recited in claim 8 wherein said software function resides within an application program.

15. A method of operation of a computer system for providing an audible alert to a user typing on a keyboard when said keyboard is in CAPS LOCK mode, comprising the steps of:
(a) entering into CAPS LOCK mode when the CAPS LOCK key is activated, said CAPS LOCK mode causing alphabetic characters associated with typed alphabetic character keys to be presented on-screen in capital letters;
(b) activating a timer when entering said CAPS LOCK mode, said timer to expire after a pre-determined unit of time;
(c) detecting user keystrokes while in said CAPS LOCK mode;
(d) restarting said timer when alphabetic character keyboard keys are typed while said timer is active and prior to the expiration of said timer, said computer system still being in said CAPS LOCK mode; and
(e) generating said audible alert when an alphabetic character keyboard key is typed while said keyboard is in said CAPS LOCK mode and after said timer has expired.

16. A method of operation of computer system for automatically turning off the CAPS LOCK mode, comprising the steps of:
(a) entering into said CAPS LOCK mode when the CAPS LOCK key is activated, said CAPS LOCK mode causing alphabetic characters associated with typed alphabetic character keys to be presented on-screen in capital letters;
(b) activating a timer when said CAPS LOCK key is activated, said timer having a duration limit;
(c) expiring said timer when said duration limit is exceeded;
(d) restarting said timer if an alphabetic key is typed while in said CAPS LOCK mode; and
(e) turning off said CAPS LOCK mode upon expiration of said timer.

* * * * *